United States Patent [19]

Bertelli et al.

[11] Patent Number: 5,166,235
[45] Date of Patent: Nov. 24, 1992

[54] FLAME RETARDANT CONCENTRATES AND PROCESS FOR THEIR PREPARATION

[75] Inventors: Guido Bertelli; Paolo Goberti, both of Ferrara, Italy

[73] Assignee: Himont Incorporated, Wilmington, Del.

[21] Appl. No.: 781,794

[22] Filed: Oct. 23, 1991

[30] Foreign Application Priority Data

Oct. 23, 1990 [IT] Italy .............................. 21837 A/90

[51] Int. Cl.$^5$ .......................... C08K 5/34; C08K 5/31; C07F 9/90; C07F 9/94
[52] U.S. Cl. ..................................... 524/93; 524/100; 524/177; 524/204; 524/410
[58] Field of Search ................. 524/410, 100, 93, 177, 524/204

[56] References Cited

U.S. PATENT DOCUMENTS 4,798,857 1/1989 Bertelli et al. ...................... 524/410
5,079,283 1/1992 Burditt et al. ........................ 524/410

FOREIGN PATENT DOCUMENTS 411628 2/1991 European Pat. Off. .
1066744 4/1986 Japan .

*Primary Examiner*—Paul R. Michl
*Assistant Examiner*—Tae H. Yoon

[57] ABSTRACT

Concentrate of a flame retardant additive, in the form of nonextruded particles, each one comprising:

A) a matrix of a nonextruded, as polymerized particle, preferably spheroidal, of a polymer or copolymer of olefins having porosity greater than or equal to 15%, expressed as a percent of the void volume on the total volume of the particle, B) the product of reaction between bismuth or antimony trichloride or tribromide, or their mixtures, and one or more amines; wherein said product (B) is made "in situ" and deposited on the surface of the matrix and inside the pores thereof.

9 Claims, No Drawings

FLAME RETARDANT CONCENTRATES AND PROCESS FOR THEIR PREPARATION

The present invention relates to nonextruded concentrates of a flame retardant additive, which can be used in the manufacture of polymers, and in particular of polyolefins, and the process for their preparation.

Published European patent application 273 458, teaches using, as flame resistant additives, complexes of bismuth or antimony halides or both with amines, having the formula:

$$R \, (MeX_3)y \qquad (I)$$

where:
R is an amine selected from the group consisting of: 2-guanidine-benzimidazole, isophorone diamine, dicyandiamide, guanamine, melamine, piperazine, optionally substituted with an alkyl, aryl or acyl group, and compounds containing from 2 to 9 triazine rings, which rings are condensed with or bonded to one another through at least one -NH group,
Me is bismuth or antimony,
X is chlorine or bromine,
y is a number from 0.3 to 4.

According to said patent application the flame retardant additive is synthesized in absence of solvents by mixing and heating the reagents, or by heating the reagents in solution or in suspension. The product obtained is ground and optionally coated with stearic acid.

On the other hand, some processes are known in the olefin polymerization field for the production o polymer particles in a regular form, in particular spheroidal, and having a controlled particle size distribution.

Due to their high flowability and the absence of fines, said particles can be used directly in polymer manufacturing plants, and represent an effective and economical alternative to the use of extruded pellets.

Published European Patent Application EP-A-411 628 describes concentrates of one or more additives, pigments or charges, directly obtained from the above mentioned polymer particles, thus eliminating the extrusion step.

According to said copending application, said concentrates are prepared in different ways depending on the physical state of the substances used as additives. The concentrates may be prepared using solid additives in powder form, or liquids or melts, preferably having a viscosity lower than 10 Poise. In any case, said concentrates can be prepared by feeding the support polymer particles and one or more additives into normal mixers for powders and using adequate residence times.

However, using the teaching of said copending patent application for the flame retardant additives, such as the ones claimed in European patent application 273 458, involves some problems from the point of view of the type of product which can be obtained, as well as the process which must be used.

In fact, the synthesis of said flame retardant additives, has shown that they are solids having a high melting point or a pasty consistency. By heating said pasty substance one obtains the above mentioned high melting solids without the intermediate formation of liquids.

Therefore, said additives could be dispersed on nonextruded polymer particles as ground solids (using the proper wetting agents) or in solution. However, the use of ground solids has the disadvantage that the dispersion of the powder in the single polymer particles becomes less homogeneous as the powder used gets coarser. In practice, the flame retardant additive would mainly be dispersed on the surface of the particle.

This would also cause problems in the subsequent stage production of processing of the concentrate, such as requiring an accurate mixture to obtain a homogeneous distribution of the additive during the stage wherein the concentrate is diluted in the polymer to be rendered flame resistant.

On the other hand, the use of a solution of the above mentioned additives involves some problems correlated with the selection of the proper solvent, since it must be capable of solubilizing the additive without introducing modifications in its chemical composition, while at the same time not appreciably solubilizing the polymer particles.

Furthermore, the use of a solution would involve a reduced load capacity of the polymer particles and the additional steps of the process consisting of removal and recovery of the solvent.

As to the total process of preparation of the concentrates, the operation would have to be carried out in at least two steps: synthesis of the flame retardant additive and dispersion of said additive into the polymer particles.

The Applicants have now found some nonextruded concentrates of a flame retardant additive, which are particularly useful for the additivation of polymers and copolymers of olefins, in which the additive is dispersed on the surface and inside the pore of the single polymer particle, and which are prepared by using a process where the itself as support.

In particular, the present invention relates to a concentrate of a flame retardant additive in the form of nonextruded, as polymerized particles comprising:
A) a matrix made up of a nonextruded particle, preferably spheroidal, of a polymer or copolymer of olefins having porosity, expressed as a percent of void volume on the volume of the particle, greater than or equal to 15%; and
B) a flame retardant material which is the reaction product of bismuth or antimony trichloride or tribromide, or their mixtures, and one or more amines selected from the group consisting of 2-guanidine-benzimidazole, isophorone diamine, dicyandiamide, guanamine, melamine, piperazine, morpholine, piperidine, optionally substituted with a alkyl, aryl, or acyl group, urea and its alkyl or aryl derivatives, mono-, di- or tri-(polyoxyalkylen) amines, polyalkylenamines, and compounds containing from 2 to 9 triazine rings which are condensed with or bonded to one another through at least one -NH- group; wherein said product (B) is made "in situ" and deposited on the surface of the matrix and inside the pores thereof.
Depending on preparation conditions the above product (B) may contain one or more complexes of the formula:

$$R \cdot (MeX_3)y \qquad (I)$$

where:
R is a compound selected from the amines above defined for (B);
Me is bismuth or antimony;
X is chlorine or bromine;
y is a number from 0.2 to 4.

A further embodiment of this invention is a process for preparing said concentrate. Said process comprises reacting:

a) bismuth or antimony trichloride or tribromide, or their mixtures, with
b) an amine or amines corresponding to R in formula (I), in the presence of nonextruded, as polymerized particles of an olefin polymer or copolymer, having a porosity greater than or equal to 15%, expressed as a percent of the void volume on the total volume of the particle, and the reaction liquid.

Therefore, the present invention offers the advantage of producing a concentrate of a flame retardant additive where said additive (product (B)) is uniformly dispersed in the polymer matrix, thereby providing homogeneous dispersion of said additive also in the subsequent steps of dilution in the polymers.

The process, by which the concentrate is obtained according to this invention, involves only one stage which comprises the preparation "in situ" of the flame retardant material, with the advantage of being considerably simple and economical.

Nonextruded, as polymerized particles of polymers and copolymers of olefins having porosity greater than or equal to 15%, expressed as percent of the void volume on the total volume of the particle, which constitute the above mentioned matrixes (A), are commercially available by HIMONT Italia S.r l.

Particularly suitable for the preparation of the concentrates of this invention are spherical particles having a porosity from 15% to 40%, preferably from 18% to 29%, and most preferably from 20 to 28%.

The olefin polymers constituting the particles are selected preferably from crystalline polypropylene particularly having an isotactic index higher than 90, polyethylene and crystalline copolymers of propylene with ethylene and/or a $CH_2=CHR'$ olefin, where $R'$ is a $C_2-C_8$ alkyl radical containing at least 85% by weight of propylene. Generally, the spherical particles constituted by the above mentioned olefin polymers have a surface area (B.E.T.) from 10 to 20 $m^2/g$ and average diameter from 50 to 7000 $\mu m$, while the pore volume distribution is such that more than 90% of them have a diameter greater than 1 $\mu m$.

Examples representative of R compounds containing triazine rings suitable for the formation of product (B) are compounds, which can normally be obtained through melamine pyrolysis, known as "melam", "melem", and "melon", for which usually are proposed the following formulas: (see "Proceedings of the Second European Symposium on Thermal Analysis", University of Aberdeen, U.K. -1-4 September 1981, Editor David Dollimore)

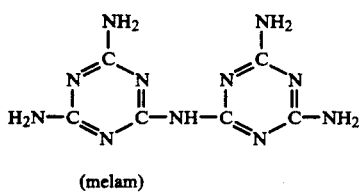

(melam)

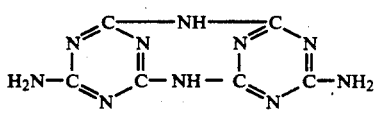

or:

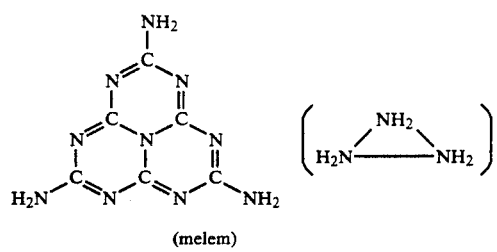

(melem)

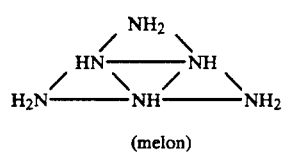

(melon)

Said compounds can be obtained by heating dicyandiamide or a triazine at temperatures from 100° C. to 300° C. or higher; in this manner one obtains the cyclization of cicyandiamide into triazine rings, and/or the polycondensation of the triazine ring to the desired degree.

As previously stated, the concentrates of the present invention are prepared by reacting a mixture comprising adequate quantities of one or more amines, and a bismuth or antimony trichloride or tribromide, or their mixtures, in the presence of polymer particles and a liquid reaction medium. As the liquid reaction medium one can preferably use water or a polar organic solvent, such as acetone and methanol.

Bismuth or antimony halides can be dissolved in the liquid reaction medium beforehand.

The relative amounts of amines and halides ar generally determined based on the type of complex desired (i.e., the desired value of y in formula (I)).

The process is usually carried out at a temperature equal to, or slightly less than the liquid reaction medium boiling point. At the end of the reaction forming product (B), the above mentioned reaction liquid is removed, preferably by evaporation.

According to a preferred process, the liquid reaction medium is gradually removed during the reaction, making it evaporate at atmospheric or reduced pressure.

Using the process of the present invention, the product which is formed as a result of the reaction between amines and metallic halides is almost completely deposited on the polymer particles constituting the matrix and inside the pores thereof, within the limits of absorption and load of said particles. Thus, concentrates containing up to 50% by weight of additive (B) can be obtained.

For the purpose of the present invention, the lowest concentration of additive (B) is preferably 5% by weight. Most preferably the concentration of additive is from 20% to 30% by weight.

According to the most preferred process, the bismuth or antimony tribromide or trichloride or mixtures thereof are also prepared "in situ", by reacting a mixture comprising one or more bismuth or antimony compounds, an aqueous solution of hydrochloric or hydrobromic acid, and one or more amines, in the presence of the polymer particles which constitute the matrix. $(BiO)_2CO_3$ and $Sb_2O_3$ are preferably used as bismuth and antimony compounds. For example, a mixture comprising $(BiO)_2CO_3$, HBr in aqueous solution at about 48% and dicyandiamide can be reacted in the presence of the porous polymer particles.

The temperature of the process is such that the water evaporates quickly. It is convenient to operate at a temperature equal to the boiling point of water.

In general, one can use directly the aqueous hydrohalide acid solution at the concentrations which are commercially available (30–50%).

The concentrate is then dried.

The total weight of the reagent mixture which is added to the polymer matrix (excluding the hydrohalide acid) to obtain product (B) is generally from 3% to 50% by weight, with respect to the total weight of the polymer particles and reagent mixture, preferably from 10% to 25% by weight.

Free radical promoter compounds can be added to the concentrate of the flame retardant additive (optionally replacing an equal quantity if said additive), in order to improve the flame extinguishing property of the final product desired.

Preferably, when the concentrates contain the free radical promoters, product (B) is present in quantities from 5 to 15% by weight, while the above mentioned free radical promoters are present in quantities from 5 to 15% by weight. Examples of free radical promoter compounds are 2,3-dimethyl-2,3-diphenylbutane, and 2,3-dimethyl-2,3-diphenylhexane. They can be present in the concentrate in quantities from 5 to 15% by weight.

Organic peroxides can also be used as sources of free radicals. They can be present in the concentrate in quantities from 3 to 9% by weight.

All the above mentioned compounds ca be added to the nonextruded, as polymerized polymer particles before the "in situ" preparation of additive (B). Preferably they are added during a subsequent step after the concentrate has been dried. Other components can also be added, such as for example, stabilizers, charges, and pigments.

HALS (Hindered Amine Light Stabilizer) can be used as light stabilizers. Among them, for example, are the ones sold by CIBA GIEGY under the Tinuvin 770 and Tinuvin 622 trademarks; their structural formulas are as follows:

TINUVIN 770

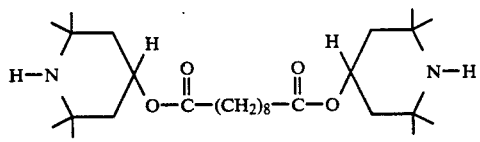

TINUVIN 622

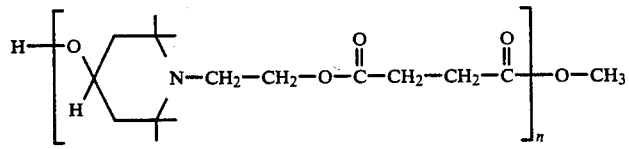

where n varies generally from 2 to 20. Tinuvin 326 can also be used having the formula below:

TINUVIN 326

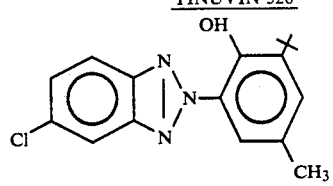

In another embodiment it has been found that stability to light improves when a certain portion of the bismuth or antimony is substituted with oxides or anhydrides of some transition metals such as for example Ti, W, Mo, and V.

Said transition metal oxides or anhydrides can be added to the polymer matrix before the "in situ" preparation of additive (B), or added subsequently during the "dilution" step of the concentrate into the polymers.

The amounts of the above mentioned oxides or anhydrides, that can be used in substitution of equal amounts of additive (B), are generally from 5 to 15% by weight with respect to the total weight of the concentrate.

As previously mentioned, the concentrates of the present invention can be conveniently used in the additivation of polymers, particularly polyolefins, in order to obtain finished products which are flame resistant.

For this purpose the concentrates can be mixed with the above mentioned polymers by using techniques which are traditionally known in the art for the manufacture of thermoplastic polymers.

Therefore, the concentrates of the present invention allow one to obtain optimum level of flame retardancy in the final products, avoiding all the disadvantages connected with the dilution of pure additives in the polymers, and in particular avoiding the use of complex machinery and mixing methods, and waste of energy as the consequence of their use.

The following examples are given to illustrate and not limit the present invention.

The properties of the polymers and concentrates which are reported in the examples have been determined according to the following methods:

| | |
|---|---|
| Isotactic index | Percent by weight of polymer insoluble in xylene at ambient temperature (25° C.) (basically corresponding to the % by weight of polymer insoluble in boiling n-heptane). |
| MI melt index | ASTM D 1238, condition L |
| Surface area | B.E.T. (apparatus used C. Erba |

| Bulk density | SORPTOMATIC 1800) DIN 53194 |
|---|---|

The porosity expressed as percent of pore void volume is determined by mercury absorption under pressure The volume of mercury absorbed corresponds to the void volume of the pores. For the determination is used a C D3 (C. Erba) dilatometer with calibrated capillary (3 mm in diameter) connected to a mercury reservoir and a high vacuum rotary pump ($1 \times 10^{-2}$ mba). A weighted amount of the sample (about 0.5 g) is introduced into the dilatometer. The apparatus is then put under high vacuum (<0.1 mm Hg) for about 10 minutes. Afterwards the dilatometer is connected to the mercury reservoir and the metal is allowed to flow slowly until the level on the capillary reaches the 10 cm. mark. The valve connecting the dilatometer to the vacuum pump is then shut off, and the apparatus is brought under pressure with nitrogen (2.5 Kg/cm$^2$). The pressure causes the mercury to penetrate the pores, and the higher the porosity of the material, the lower the level of the mercury.

Once the measure of the position of the capillary, where the new level of mercury has stabilized, is determined the volume of the pores is calculated as follows: $V = R^2 \pi \Delta H$, where R is the radius of the capillary in cm; $\Delta H$ is the difference in cm between the initial and final levels of the mercury column.

The volume of the sample is given by:

$$V1 = \frac{P1 - (P2 - P)}{D}$$

where
P is the weight in grams of the sample;
P1 is the weight in grams of the dilatometer+mercury
P2 is the weight in grams of the dilatometer+mercury +sample;
D=mercury density (at 25° C.=13.546 g/cc).
The porosity % is given by:

$$X = \frac{100 \cdot V}{V1}$$

EXAMPLES 1-7

Into a 1 liter flask with 4 necks, equipped with a half-moon Teflon agitator, dropping funnel, vacuum connection, and immersed in an oil bath at 40°-50° C., are introduced 80 g of porous SPL 120 polypropylene having a MI of about 24 g/10 minutes, isotactic index of about 96%, porosity (expressed as percent of pore volume) of about 29%, bulk density of 0.340 Kg/1, in the form of spherical particles having an average diameter from 1000 to 2000 μm.

Afterwards are added, in the amounts specified in Table 1, bismuth basic carbonate produced by Pharmacie Centrale de France, and/or antimony sesquioxide sold by Associated Lead under the trademark of Timonox, dicyandiamide produced by SKW, and hydrobromic acid manufactures by Merk, in a 48.6% aqueous solution.

The bath is brought to 120° C. and the mixture is maintained under agitation at reduced pressure (about 0.7 atm) for 1 hour. During this step the water is removed by evaporation at reduced pressure.

Once this first phase is ended, it is cooled to 90.C, the atmospheric pressure is restored, the appropriate quantity of Interx CCDFB dimethyl-diphenyl butane is added, and the mixture is allowed to cool slowly, while the mass is maintained under agitation.

The concentrate thus obtained is in the form of spherical particles which present a homogeneous yellow color even in cross-section.

Said concentrate is then diluted with an olefin polymer in order to prepare the samples to be used for the evaluation of the flame retardant properties.

The preparation of said samples is carried out by mixing cold Moplen FLF 20 (isotactic polypropylene with a MI of 12 g/10 minutes and isotactic index of about 96%) with 5% by weight of the prepared concentrate and then extruding it in a single screw extruder at 200° C.

The granules thus obtained are die-cast into plaques with a thickness of about 3 mm and samples for the flame resistance tests are cut from them.

The level of flame resistance of the samples is determined both by measuring the oxygen index (according to ASTM regulation 2863) and by applying UL 94 norms (issued by Underwriter Laboratories - USA).

The oxygen index measure represents the minimum concentration of oxygen (expressed in % vol) in an oxygen-nitrogen mixture which allows the sample of the material being examined, after having been ignited with a butane gas flame, to burn continuously for 3 minutes and/or for 50 mm of the length of the sample.

The UL 94 test must be conducted on samples which are positioned vertically and have the thickness indicated in the test method. Said test consists of placing in contact with one of the sample borders a 3 mm high source at a 45 degree angle. From the moment that the source is removed, one observes the time it takes for the sample to extinguish, and whether the material drips or not during combustion.

Based on the measurements, the material is classified as follows:
V-0 when the average extinguishing time of the flame is less than or equal to 5 seconds (5 tests at 2 ignitions each)
V-1 when the average extinguishing time of the flame is less than or equal to 25 seconds
V-2 when it behaves like V-1, and also drips droplets of lighted melted polymer capable of igniting a cotton ball located 5 mm under it.

Four tests are conducted on each sample, and the extinguishing times reported refer to each ignition.

The quantity and type of reagents used for the preparation of the concentrates and samples are shown in Table 1, together with the results of the flame resistance tests.

The concentration by weight of the flame resistant additive on the samples prepared according to examples 1-7 is about 0.5%.

TABLE 1

| | Example No. | | | | | | |
|---|---|---|---|---|---|---|---|
| | 1 | 2 | 3 | 4 | 5 | 6 | 7 |
| PREPARATION OF | | | | | | | |

TABLE 1-continued

| | Example No. | | | | | | |
|---|---|---|---|---|---|---|---|
| | 1 | 2 | 3 | 4 | 5 | 6 | 7 |
| CONCENTRATE | | | | | | | |
| SPL 120 resin (g) | 80 | 80 | 80 | 80 | 80 | 80 | 80 |
| (BiO)$_2$CO$_3$ (g) | 2.91 | 3.1 | 3.4 | 2.38 | 3.15 | 2.73 | 2.02 |
| Sb$_2$O$_3$ (g) | — | — | — | 0.91 | 0.45 | 0.67 | 1.15 |
| Dicyandiamide (g) (C$_2$H$_4$N$_4$) | 4.31 | 4.60 | 5.00 | 2.94 | 2.89 | 2.92 | 2.99 |
| Interox CCDFB (g) | 10 | 10 | 10 | 10 | 10 | 10 | 10 |
| HBr (g) | 3.80 | 3.00 | 2.20 | 3.80 | 3.70 | 3.71 | 3.84 |
| TESTS ON SAMPLES | | | | | | | |
| UL 94 | V-2 × 4 | V-2 × 4 | V-2 × 4 | V-2 × 4 | V-2 × 4 | V-2 × 4 | V-2 × 4 |
| Time (sec.) | 1/1/1/1 | 2/1/1/1 | 10/8/10/7 | 3/2/1/2 | 1/2/3/1 | 1/1/2/2 | 2/2/2/2 |
| Oxygen Index | 30 | 27 | 26 | 30.2 | 30.2 | 29.5 | 30.7 |

EXAMPLE 8

Into the same flask used in Examples 1-7, immersed in an oil bath at 45°-50° C., are introduced 70 g of the same porous spherical polypropylene of Examples 1-7.

Afterwards are added 4.37 g of bismuth basic carbonate produced by Pharmacie Centrale de France, 6.47 g of dicyandiamide produced by SKW, and 5.7 ml of hydrobromic acid manufactured by Merk in a 48.6% aqueous solution.

The procedure is carried out in the same as in Examples 1-7, adding 15 g of Interox CCDFB.

The concentrate thus obtained is in the form of spherical particles with a homogeneous yellow color even in cross-section.

Table 2 shows the theoretical and analytical values of the percentage by weight of bismuth and bromine with respect to the weight of the concentrate, as well as the amounts of reagents used.

By theoretical value of the percentage by weight of Bi or Br is meant the value which should be obtained if all the Bi or Br added during the additive preparation step were deposited on the polymer particle.

On the other hand, the analytical value is the percentage by weight of Bi or Br actually deposited in the polymer particles and experimentally measured with analytical methods.

COMPARATIVE EXAMPLE 1

The procedure is the same as in Example 8, except that, instead of using a porous spherical polypropylene as the polymer matrix, a polypropylene with an isotactic index of about 96% and MI of 12 g/10 min. is used, in the form of spheroidal particles having an average diameter from 1500 μm to 2500 μm and porosity of 6.7% measured as percentage of void volume.

Table 2 shows the theoretical and analytical values of the percentage by weight of bismuth and bromine with respect to the weight of the concentrate, as well as the amount of reagents used.

COMPARATIVE EXAMPLE 2

The procedure is the same as in Example 8, except that instead of using a porous spherical polypropylene as the polymer matrix, polypropylene flakes with an isotactic index of about 96% and MI of 12 g/10 min. are used, whose particles have an average diameter from 400 μm to 800 μm and porosity of 13.4%.

Table 2 shows the theoretical and analytical values of the percentage by weight of bismuth and bromine with respect to the weight of the concentrate, as well as the amount of reagents used.

TABLE 2

| EXAMPLE NO. | 8 | 1 COMPARATIVE | 2 COMPARATIVE |
|---|---|---|---|
| Spherical porous PP (g) | 70 | — | — |
| Spherical PP (g) | — | 70 | — |
| Flakes (g) | — | — | 70 |
| (BiO)$_2$CO$_3$ (g) | 4.37 | 4.37 | 4.37 |
| Dicyandiamide (g) | 6.47 | 6.47 | 6.47 |
| HBr (ml) | 15.7 | 15.7 | 15.7 |
| Interox CCDFB (g) | 15 | 15 | 15 |
| Theoretical % Bi | 0.36 | 0.36 | 0.36 |
| Analytical % Bi | 0.33 | 0.20 | 0.19 |
| Theoretical % Br | 0.52 | 0.52 | 0.52 |
| Analytical % Br | 0.48 | 0.37 | 0.29 |

Evaluating the data in Table 2 and considering for each example the difference between the theoretical and analytical values of the percentage by weight of Bi and Br as a quantity related to the absorption and load capacity of a polymer matrix, one can see that the absorption capacity of a polymer matrix with respect to the additive is influenced mainly by the nature of said polymer matrix.

One can also see that in the case of porous spherical polypropylene, the absorption capacity is very high, and the product that is formed as a result of the reaction between amines and metal halides is almost totally deposited on and in the polymer matrix.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A concentrate of flame retardant additive in the form of nonextruded particles comprising:
   A) a matrix made up of a nonextruded, as polymerized particle of a polymer o copolymer of olefins having porosity, expressed as a percent of void volume on the volume of the particle, greater than or equal to 15%; and
   B) a flame retardant material which is the reaction product of bismuth or antimony trichloride or tribromide, or their mixtures, and one or more amines selected from the group consisting of 2-guanidine-benzimidazole, isophorone diamine, dicyandiamide, guanamine, melamine, piperazine, morpholine, piperidine, optionally substituted with an alkyl, aryl or acyl group, urea and its alkyl or aryl derivatives, mono-,di- or tri-(polyoxyalkylen)amines, polyalkylenamines and compounds containing from 2 to triazine rings which are condensed with or bonded to one another through at least one —NH— group; wherein said product (B) is made "in situ" in the presence of said nonextruded, as polymerized particle, and deposited on the surface of the matrix and inside the pores thereof.

2. The concentrate of claim 1, wherein the particle constituting the matrix (A) is a spheroidal particle having a porosity from 15% to 40%.

3. The concentrate of claim 1, wherein the polymer constituting the matrix (A) is selected from crystalline polypropylene, polyethylene or crystalline copolymers of propylene with ethylene and/or a $CH_2=CHR'$ olefin, where R' is a $C_2$-$C_8$ alkyl radical, containing at least 85% by weight of propylene.

4. The concentrate of claim 1, where product (B) contains one or more complexes of the formula:

$$R\,(MeX_3)_y \qquad (I)$$

where:
R is a compound selected from the group consisting of 2-guanidine-benzimidazole, isophorone diamine, dicyandiamide, guanamine, melamine, piperazine, morpholine, piperidine, optionally substituted with an alkyl, aryl or acyl group, urea and its alkyl or aryl derivatives, mono-,di- or tri-(polyoxyalkylen)amines, polyalkylenamines and compounds containing from 2 to 9 triazine rings which are condensed with or bonded to one another through at least one —NH— group;
Me is bismuth or antimony;
X is chlorine or bromine;
y is a number from 0.2 to 4.

5. The concentrate of claim 4, where $MeX_3$ is bismuth tribromide and R is dicyandiamide, guanamine or melamine.

6. A process for the preparation of the concentrate of claim 1, comprising the reacting:
   a) bismuth or antimony trichloride or tribromide, or their mixtures, with
   b) an amine or amines selected from the group consisting of 2-guanidine-benzimidazole, isophorone diamine, dicyandiamide, guanamine, melamine, piperazine, morpholine, piperidine, optionally substituted with an alkyl, aryl or acyl group, urea and its alkyl or aryl derivatives, mono-,di- or tri-(polyoxyalkylen)amines, polyalkylenamines and compounds containing from 2 to triazine rings which are condensed with or bonded to one another through at least one —NH— group; in situ in the presence of nonextruded, as polymerized particles of an olefin polymer or copolymer, having a porosity greater than or equal to 15%, expressed as percent of void volume on the volume of the particles, and the liquid reaction medium.

7. The process of claim 6 comprising reacting:
bismuth basic carbonate and/or antimony sesquioxide, hydrobromic or hydrochloric acid in aqueous solution, and the amine or amines in the presence of nonextruded, as polymerized polymer particles in spheroidal form having a porosity from 15% to 40%.

8. The process of claim 6, wherein the total quantity of the reagents added to the polymer matrix is from 3% to 50% by weight with respect to the total weight of concentrate.

9. The process of claim 8, wherein the total quantity by weight of the reagents added to the polymer matrix is from 10% to 25% by weight with respect to the total weight of the concentrate.

* * * * *

UNITED STATES PATENT AND TRADEMARK OFFICE
CERTIFICATE OF CORRECTION

PATENT NO. : 5,166,235
DATED : November 24, 1992
INVENTOR(S) : Bertelli et al

It is certified that error appears in the above-indentified patent and that said Letters Patent is hereby corrected as shown below:

Col. 1, line 32, change "o" to --of--.

Col. 2, line 31, change "pore" to --pores--.

Col. 2, line 33, after "where the" insert --additive is made "in situ", using the particles of the polymer--.

Col. 5, line 31, change "ca" to --can--.

Col. 10, line 57, change "o" to --or--.

Signed and Sealed this

Fourteenth Day of December, 1993

Attest:

BRUCE LEHMAN

*Attesting Officer*     *Commissioner of Patents and Trademarks*